H. D. CHURCH.
MOTOR VEHICLE.
APPLICATION FILED OCT. 18, 1916.
1,336,462.
Patented Apr. 13, 1920.
2 SHEETS—SHEET 1.
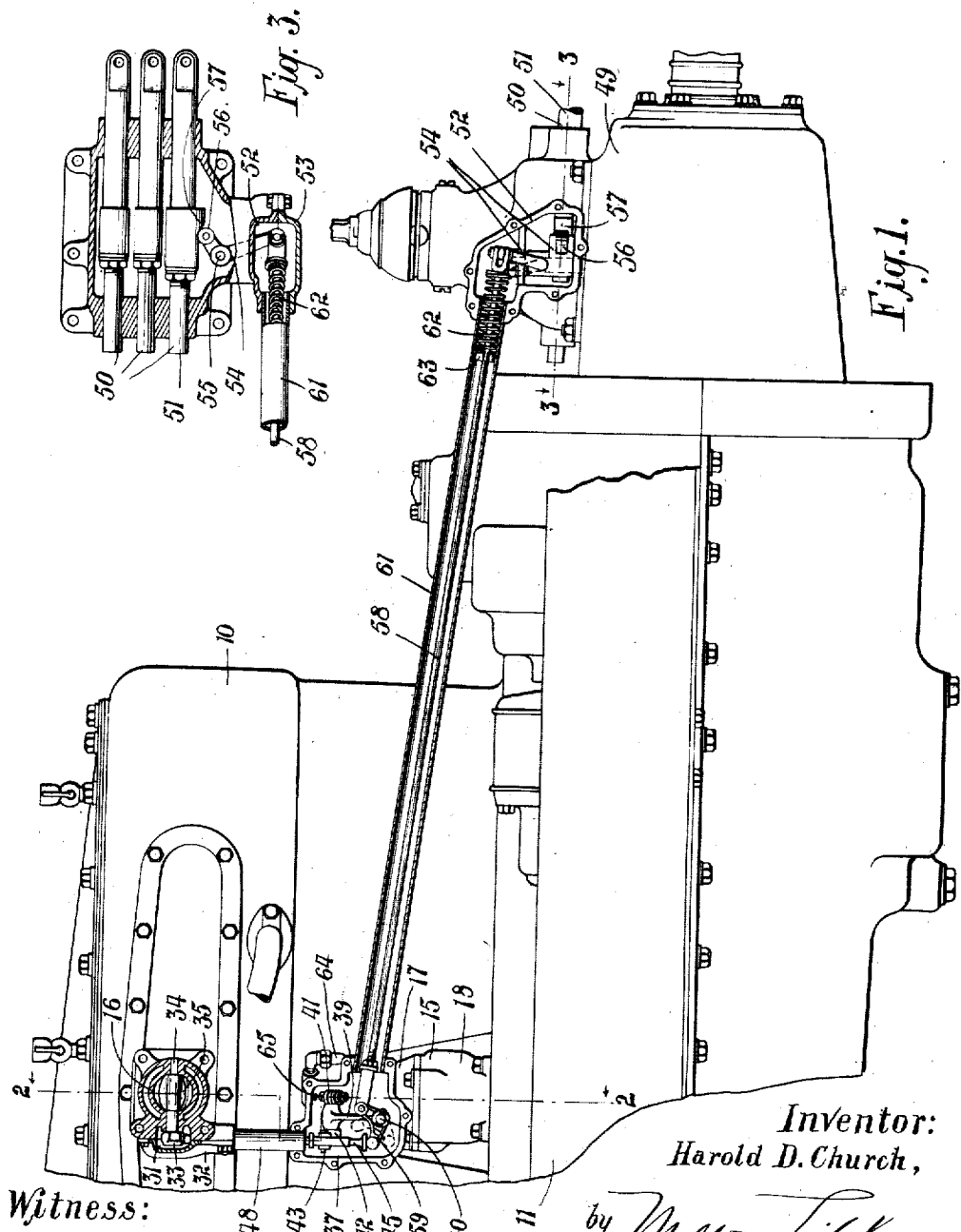
Inventor:
Harold D. Church,
Witness:
J. E. L. Blackmore
by Milton Tibbetts,
Atty.

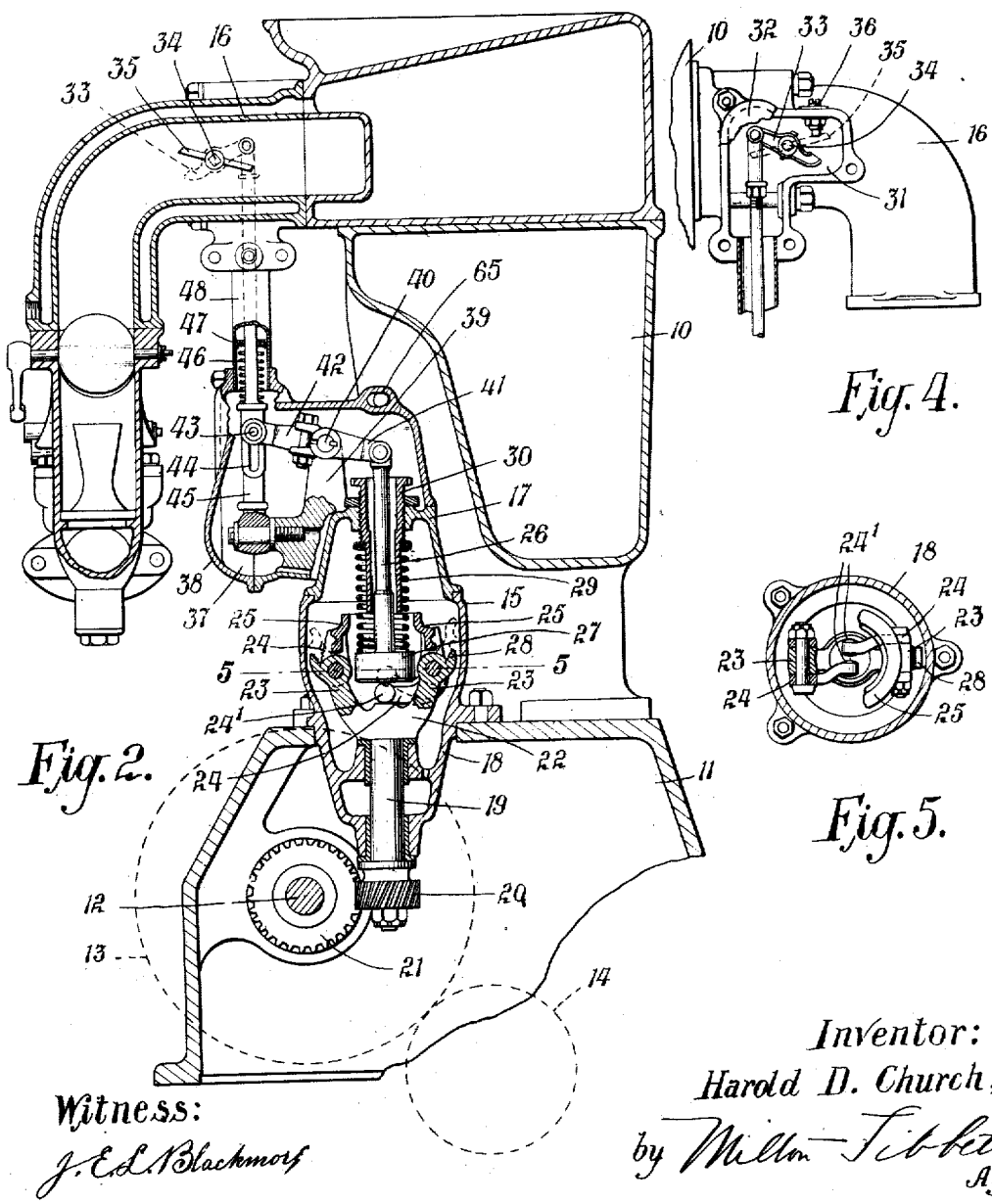

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,336,462.  Specification of Letters Patent.  Patented Apr. 13, 1920.

Application filed October 18, 1916. Serial No. 126,398.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles and more particularly to the motor control mechanism thereof.

It has been deemed advantageous to provide a motor control mechanism for commercial motor vehicles whereby the speed of the motor is limited to a safe degree and thus prevent abuse of the vehicle and danger to traffic in general due to overspeeding.

One disadvantage, however, to so controlling the motor speed is the difficulty of securing sufficient power for moving the vehicle in extremely bad road conditions or in starting, and at such times it is necessary to have the customary change speed gearing set to utilize one of the lower gear ratios in the transmission of the motor power to the running gear.

One of the objects of the present invention is to govern the vehicle speed without limiting the motor speed for power purposes.

Another object of the invention is to provide a speed control mechanism operatively governed by the change speed gearing.

Another object of the invention is to permit speeding of the motor while connected to a low ratio gear transmission.

Another object of the invention is to provide a motor control mechanism of simple and durable mechanical construction.

Another object of the invention is to provide adequate lubricating means for the governor.

Another object of the invention is to inclose the several operative parts to prevent unauthorized tampering.

Another object of the invention is to provide a novel construction of governor.

Other objects of the invention will appear from the following description taken in connection with the drawings which form a part of this specification, and in which:

Figure 1 is a side elevation of the rear half of a hydrocarbon motor having a change speed mechanism and speed governor connected thereto;

Fig. 2 is an enlarged transverse vertical section on the line 2—2 in Fig. 1;

Fig. 3 is a sectional plan view on the line 3—3 in Fig. 1;

Fig. 4 is an enlarged elevation of the intake manifold on the opposite side to that shown in Fig. 2 with the cover plate removed; and Fig. 5 is a sectional plan view on the line 5—5 in Fig. 2.

Referring to the drawings, 10 represents a hydrocarbon motor having a crank case 11 in which is mounted a cam shaft 12 suitably connected as by gears 13 and 14 (indicated diagrammatically in dotted lines on Fig. 2) with the motor crank shaft.

A centrifugally operated governor 15 is shown mounted on the crank case immediately beneath the gas intake pipe 16 and comprises a housing having an upper part 17 and a lower part 18 in which a vertically extending shaft 19 is suitably journaled and operatively connected at the lower end thereof with the cam shaft 12 as by the spiral gears 20 and 21.

The shaft 19 at its upper end is fitted with a bracket 22 having diametrically opposite arms 23 extending upwardly therefrom and pivotally supporting bell crank levers 24, each of said levers having a section extending toward the center of the bracket 22 and terminating in a roll shaped contact 24' and an upwardly extending section terminating in arc-shaped weights 25, whereby the rotation of the vertical shaft 19 through its gear connection with the cam shaft 12 will tend to spread the weighted sections of the bell crank levers 23 outwardly and thus raise the center roll shaped contacts 24, the outward movement of said bell crank levers being limited by the stop lugs 28, as shown in dotted lines Fig. 2.

The upper half 17 of the housing has a pintle 26 extending downwardly between the bell crank levers 23 and fitted with a bearing cap 27 swivelly mounted at the extreme lower end and bearing upon the roll contacts 24. A spiral spring 29 is arranged about the pintle 26 between the cap 27 and an adjustable bushing 30, threaded into the upper end of the housing whereby the downward spring pressure on the bearing cap may be adjusted.

The above-described parts comprise the governor proper centrifugally operated from the cam shaft of the motor in a positive manner and further connected to a throttle control mechanism as follows:

A side chamber 31 is formed on one side of the upper part of the intake pipe 16 partly integral with said pipe and closed by the cover 32 and housing a lever 33 fastened to a pivot pin 34 extending through the intake pipe 16 and having a throttle valve 35 mounted thereon to control the gas permitted to pass through said intake pipe 16, said valve being limited in action by a set screw 36 extending through the upper wall of the chamber 31 and contacting with one end of the lever 33.

A chamber 37 somewhat similar to the chamber 31 is formed on one side of the upper part of the governor housing 17 partly integral therewith and closed by the cover 38 and has a bearing bracket 39 extending upwardly substantially in the center thereof. A rock shaft 40 is journaled in the bearing 39 and has the arms 41 and 42 fixedly secured at the respective ends thereof and extending in opposite directions therefrom. One arm 41 is pivotally connected to the upper end of the pintle 26 and the other arm 42 has a pin connection 43 extending through a slot 44 in a connecting throttle rod 45, said rod being pivotally secured at the upper end thereof to the lever 33 and thereby connecting the throttle valve with the governor.

A spiral spring 46 is arranged around the throttle rod 45 above the slotted lower end thereof and a partition plate 47 secured in a casing tube 48; said tube extending about said rod and having the ends thereof clamped between the cover and body parts of the chambers 31 and 37, whereby a complete housing is formed for the several parts as hereinbefore described. The spring 46 always tends to force the throttle rod 45 down and move the throttle valve 35 to closed position, said throttle rod and valve however being held to open position by the rocker arm 42 until such time as the motor speed is sufficient to operate the centrifugal weights 25 and raise the pintle 26 as hereinbefore explained thus rocking the shaft 40 to lower the outer end of the arm 42 and consequently the throttle rod 45 to close the valve.

The arrangement of parts as explained in the foregoing will operate to limit the motor speed and as additional power is often an advantage when starting a loaded vehicle under heavy load or unfavorable road conditions, it is provided in this invention to control the operations of the governor as hereinafter fully described.

The motor 10 has the crank shaft thereof connected with a change speed gearing 49 of any desired form and for the customary purposes of altering the speed ratio between the motor and the driving wheels of the vehicle and having the shifter rods 50 operatively connected to the various change speed gears and operated by longitudinal shifting movement. The rod 51 is connected to place the high ratio gear in operating position that is have the motor connected to the drive wheels of the vehicle to drive said vehicle at its greatest speed, and it is particularly this speed which it is desired to govern. To accomplish the above object a chamber 52 is formed partly integral with the casing of the change speed gearing 49 and partly with the cover 53 and having a bell crank lever 54 pivotally mounted on a stud pin 55 in said casing and having a roller 56 mounted at the end of one arm and contacting with a cam surfaced sleeve 57 on the shifter rod 51. The other end of the lever is pivotally secured to one end of the connecting rod 58 said rod extending to the chamber 37 where it is pivotally connected to one arm of a bell crank lever 59 pivotally mounted on a stud pin 60 extending from the bearing bracket 39 the other arm of said bell crank lever 59 bearing against the lower end of the throttle rod 45. An inclosing tube 61 surrounds the connecting rod 58 and is clamped at the ends thereof between the body parts and covers of the respective chambers 37 and 52. A spiral spring 62 encircles the rod 58 between the end next the bell crank lever 54 and a partition plate 63 in said tube whereby the bell crank lever 54 is spring held into contract with the cam shaped sleeve 57 and as shown in Fig. 1 the bell crank lever 59 is spring held in position to contact with the lower end of the throttle rod 45 and retain the same in its raised position with the throttle valve 35 open. As explained above the governor mechanism serves only to move the arm 42 of the rock shaft 40 in the slot 44 of the throttle rod and since the spring 62 on the rod is stronger than the spring 46 the rod will remain in its raised position and the throttle valve 35 will remain open regardless of the action of the governor. Thus the effect of the governor on the throttle valve is nullified so that the motor is in no manner retarded or checked in power until the change speed gearing is operated to place the high speed ratio gearing into operative connections with the motor. This means moving the shifter rod 51 so that the raised part of the cam 57 passes under the roller 56 of the bell crank lever 55 and moves the connecting rod 58 to lower the arm of the bell crank lever 59 which is under the throttle rod when the motor attains a speed sufficient to operate the centrifugal governor the throttle rod will be free to lower and close the throttle valve to control the vehicle speed. The vehicle speed which it is desired to limit can only be attained while the high speed ratio gear shifter rod is in the position as last explained so that this advantage is obtained while the motor is still left free to transmit its maximum power when exceptionally heavy conditions or work require the same. It will be noted that all parts throughout are connected in such a manner that all operation is spring controlled and no parts are positively connected which might be forced beyond their strength and thus be broken and the rotating elements pertaining to the governor are effectually lubricated by a supply of lubricant which may be fed by the customary motor forced lubrication system, not shown, through a pipe 64 to an opening 65 in the top of the governor housing so that the lubricant will find its way into and about all the rotating parts of the governor as they are vertically arranged beneath said oil feed opening 65.

But one form of the invention is shown but it will be understood that other forms and changes and alterations may be made within the scope of the claims without departing from the invention.

Having thus described my invention, what I claim and desire to secure by Letters Patent is:—

1. In a motor vehicle, the combination with a hydrocarbon motor and a continuously driven governor for regulating the speed thereof, of change speed gear mechanism driven by said motor, gear shifting means for said mechanism, and means controlled by said shifting means for nullifying the regulating action of said governor.

2. In a motor vehicle, the combination with a hydrocarbon motor and a governor for regulating the speed thereof, of change speed gear mechanism driven by said motor, gear shifting means for said mechanism, and spring actuated means controlled by said shifting means for nullifying the regulating action of said governor.

3. In a motor vehicle, the combination with a hydrocarbon motor and a governor for regulating the speed thereof, of change speed gear mechanism driven by said motor, gear shifting means for said mechanism, spring actuated means for preventing the regulating function of said governor, and means controlled by said gear shifting means for nullifying the action of said spring actuated means.

4. In a motor vehicle, in combination a hydrocarbon motor having a throttle valve, a continuously driven governor connected to and arranged to operate said valve, change speed gear mechanism, gear shifting means for said mechanism and means controlled by said shifting means to prevent the operation of said valve by said governor when certain of said change gears are in mesh.

5. In a motor vehicle, the combination with a hydrocarbon motor and a governor driven by the motor for regulating the speed thereof, of change speed gear mechanism driven by said motor, gear shifting means for said mechanism, and means controlled by said shifting means for preventing the regulating action of said governor when certain of the gears in said mechanism are in mesh and for permitting the regulating action of said governor when others of the gears in said mechanism are in mesh while permitting the operation of the governor by the motor.

6. In a motor vehicle, the combination with a hydrocarbon motor having a throttle valve and a spring normally tending to close said valve, of a governor, means actuated by said governor for permitting the operation of said spring at certain speeds, change speed gear mechanism driven by said motor, gear shifting means for said mechanism, and means controlled by said shifting means for preventing the operation of said spring.

7. In a motor vehicle, the combination with a hydrocarbon motor having a throttle valve and a spring normally tending to close said valve, of a governor, means actuated by said governor for permitting the operation of said spring at certain speeds, change speed gear mechanism driven by said motor, gear shifting means for said mechanism, and means controlled by said shifting means for permitting the operation of the governor actuated means, said means controlled by said shifting means being actuated when certain only of the gears in said mechanism are in mesh.

8. In a motor vehicle, the combination with a hydrocarbon motor having a throttle valve, of a spring mechanism tending to close said valve, a second stronger spring mechanism counteracting the first spring mechanism and tending to open said valve, and a third spring mechanism counteracting the first spring mechanism independently of the second spring mechanism.

9. In a motor vehicle, the combination with a hydrocarbon motor having a throttle valve, of a spring mechanism tending to close said valve, a second stronger spring mechanism counteracting the first spring mechanism and tending to open said valve, a governor adapted at certain speeds to oppose said second spring mechanism and permit the functioning of said first spring mechanism, and a third spring mechanism adapted to counteract said first spring mechanism and hold the valve closed regardless of said governor action.

10. In a motor vehicle, the combination with a hydrocarbon motor having a throttle valve, of a spring mechanism tending to close said valve, a second stronger spring mechanism counteracting the first spring mechanism and tending to open said valve, a governor adapted at certain speeds to oppose said second spring mechanism and permit the functioning of said first spring mechanism, change speed gear mechanism, gear shifting means for said change speed gear mechanism, and means controlled by said gear shifting means and adapted to counteract said first spring mechanism and hold the valve closed regardless of said governor action.

11. In a motor vehicle, the combination with a hydrocarbon motor having a throttle valve, of a spring mechanism tending to close said valve, a second stronger spring mechanism counteracting the first spring mechanism and tending to open said valve, a governor adapted at certain speeds to oppose said second spring mechanism and permit the functioning of said first spring mechanism, a third spring mechanism adapted to counteract said first spring mechanism and hold said valve closed regardless of said governor action, change speed gear mechanism, and means carried by said mechanism to nullify the action of said third spring mechanism when certain gears of said gear mechanism are in mesh.

12. In a motor vehicle, in combination, a motor having a throttle valve, a governor unit operatively connected to said motor, a spring held connecting rod pivotally connected at one end thereof to said throttle valve and a rocker shaft having an arm operatively connected to said governor and an arm connected to said rod and having a limited free movement in relation thereto.

13. In a motor vehicle, in combination, a motor having a throttle valve, a governor unit operatively connected to said motor, a spring held connecting rod pivotally connected at one end thereof to said throttle valve and a rocker shaft having an arm operatively connected to said governor, an arm connected to said rod and having a limited free movement in relation thereto, a change speed gear and means operatively connected with said change speed gear for controlling the relative free movement between said rocker shaft arm and said rod.

In testimony whereof I affix my signature.

HAROLD D. CHURCH.